United States Patent
Kido et al.

(10) Patent No.: US 6,957,542 B1
(45) Date of Patent: Oct. 25, 2005

(54) FUEL TANK SYSTEM

(75) Inventors: Katsuyuki Kido, Seto (JP); Masahide Kobayashi, Aichi-ken (JP); Takashi Ishikawa, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 48 days.

(21) Appl. No.: 09/702,769

(22) Filed: Nov. 1, 2000

(30) Foreign Application Priority Data

Nov. 9, 1999 (JP) ............................. P. 11-318077
Nov. 9, 1999 (JP) ............................. P. 11-318268

(51) Int. Cl.[7] ......................... F02M 33/02; F25B 21/02
(52) U.S. Cl. ......................... 62/3.2; 123/519; 220/562
(58) Field of Search ................ 220/562–564, 220/567.1, 4.14; 123/518, 520, 519, 541, 123/41.31, 516; 280/830, 832; 137/338; 62/3.2

(56) References Cited

U.S. PATENT DOCUMENTS

| | | | | |
|---|---|---|---|---|
| 673,073 | A * | 4/1901 | Bobrick ................ | 220/560.14 |
| 1,477,686 | A * | 12/1923 | Braender .................... | 138/148 |
| 2,120,779 | A * | 6/1938 | Ericson .................... | 123/41.31 |
| 2,885,865 | A * | 5/1959 | Muenger et al. .............. | 62/98 |
| 2,994,311 | A * | 8/1961 | Shuck ........................ | 123/541 |
| 3,804,292 | A * | 4/1974 | Chiti .......................... | 137/264 |
| 3,887,104 | A * | 6/1975 | Cole .......................... | 220/722 |
| 3,912,107 | A * | 10/1975 | Baumann .................... | 206/524 |
| 3,984,994 | A * | 10/1976 | Ehle et al. .................... | 62/45.1 |
| 4,283,067 | A * | 8/1981 | Weber et al. ................. | 280/834 |
| 4,750,631 | A * | 6/1988 | Hastings et al. ............. | 220/501 |
| 5,056,493 | A * | 10/1991 | Holzer ....................... | 123/516 |
| 5,218,944 | A * | 6/1993 | Leonard ..................... | 123/557 |
| 5,533,486 | A * | 7/1996 | Qutub ........................ | 123/541 |
| 5,584,279 | A * | 12/1996 | Brunnhofer ................. | 123/514 |
| 5,596,971 | A * | 1/1997 | Kidokoro .................... | 123/516 |
| 5,722,374 | A * | 3/1998 | Kidokoro et al. ........... | 123/516 |
| 6,308,692 | B1 * | 10/2001 | Ishikawa et al. ............ | 123/519 |
| 6,453,885 | B1 * | 9/2002 | Short ......................... | 123/518 |
| 6,491,180 | B2 * | 12/2002 | Distelhoff et al. .......... | 220/562 |
| 6,533,002 | B1 * | 3/2003 | Kobayashi et al. ......... | 141/302 |

FOREIGN PATENT DOCUMENTS

| | | | | |
|---|---|---|---|---|
| DE | 3600177 | * | 7/1986 | ............... 280/832 |
| JP | 57-28021 | * | 2/1982 | |
| JP | 57-200662 | * | 12/1982 | |
| JP | 63-212756 | * | 9/1988 | |

(Continued)

*Primary Examiner*—Joseph C. Merek
(74) *Attorney, Agent, or Firm*—Finnegan, Henderson, Farabow, Garrett & Dunner, LLP

(57) ABSTRACT

A fuel tank body has a double-layer structure composed of an inner tank shell and an outer tank shell, so that an inter-tank-shell space is formed therebetween. Because heat of fuel in the fuel tank body is discharged into the inter-tank-shell space, the temperature of fuel in the fuel tank body is prevented from rising. If the pressure in a canister becomes negative due to a negative pressure in an intake system of an engine, more specifically, a negative pressure in a surge tank leading to an air cleaner, high-temperature air in the inter-tank-shell space between the inner tank shell and the outer tank shell flows into the canister. On the other hand, low-temperature air flows from the air cleaner into the inter-tank-shell space which has become negative in pressure.

18 Claims, 6 Drawing Sheets

FOREIGN PATENT DOCUMENTS

| | | | |
|---|---|---|---|
| JP | 4-90425 | * | 8/1992 |
| JP | 5-12655 | * | 2/1993 |
| JP | 61-39629 | * | 5/1994 |
| JP | 8-118971 | | 5/1996 |

* cited by examiner

FUEL TANK SYSTEM

INCORPORATION BY REFERENCE

The disclosures of Japanese Patent Application Nos. HEI 11-318077 filed on Nov. 9, 1999 and HEI 11-318268 filed on Nov. 9, 1999, including the specifications, drawings and abstracts are incorporated herein by reference in their entirety.

BACKGROUND OF THE INVENTION

1. Field of the Invention

The present invention relates to a fuel tank system and, more particularly, to a fuel tank system installed in a vehicle such as an automobile.

2. Description of the Related Art

Some fuel tank systems installed in a vehicle such as an automobile are designed to inhibit a rise in temperature in a fuel tank with a view to reducing the amount of fuel vapor generated in the fuel tank. Japanese Utility Model Publication No. HEI 4-90425 discloses an example of such fuel tank systems.

In a fuel tank system shown in FIG. 7, the periphery of a lower portion of a fuel tank 110 is covered with a heat insulation cover 114 through a heat insulation layer 112. In this construction, since the heat insulation layer 112 insulates heat from the outside of the fuel tank 110, it is possible to inhibit a rise in temperature in the fuel tank 110.

However, in such a construction, if the fuel tank 110 has been heated to a high temperature, the heat insulation layer 112 maintains the fuel tank 110 at the high temperature. That is, the fuel tank 110 remains at the high temperature.

On the other hand, Japanese Utility Model Publication No. HEI 5-12655 discloses fuel tanks shown in FIGS. 8A, 8B.

As shown in FIG. 8A, in this fuel tank, vapor flowing out of an enclosed fuel tank body 200 is introduced into a vapor introduction port 206A of a canister 206 through an air breather pipe 204. The air breather pipe 204 is opened when the pressure of the vapor becomes equal to or greater than a predetermined value. A purge air intake pipe 208, which communicates at one end with the atmosphere and at the other end with a purge air introduction port 206B of the canister 206, penetrates the fuel tank body 200. Further, as shown in FIG. 8B, a plurality of cooling fins 208A are provided along an outer periphery of the purge air intake pipe 208 which is located in the fuel tank body 200. Outside air flowing through the purge air intake pipe 208 cools the interior of the fuel tank body 200.

In this fuel tank, a cooling effect can be achieved if outside air is lower in temperature than the interior of the fuel tank body 200. However, if outside air has become higher in temperature than the interior of the fuel tank body 200, the temperature in the fuel tank body 200 further rises due to the temperature of the outside air. Thus, cooling effect cannot be achieved sufficiently.

SUMMARY OF THE INVENTION

It is an object of the present invention to provide a fuel tank capable of enhancing a cooling efficiency of a fuel tank body.

According to a first aspect of the present invention, there is provided a fuel tank system comprising a fuel tank inner shell which accommodates fuel, one or a plurality of fuel tank outer shells which are disposed outside the fuel tank inner shell with a space formed between the fuel tank outer shells and the fuel tank inner shell, and a heat insulation material provided on at least one of the fuel tank outer shells.

That is, in this fuel tank system, the fuel tank body has a so-called multi-layer fuel tank shell structure composed of the fuel tank inner shell and the fuel tank outer shell.

If a heat insulation material is provided on at least one of the fuel tank outer shells, transmission of heat from the outer shells to the fuel tank body can be prevented. This makes it possible to inhibit a rise in temperature in the fuel tank body.

Further, the fuel tank outer shells are disposed with a space formed between themselves and the fuel tank inner shell. Thus, if the temperature in the fuel tank inner shell has risen, heat in the fuel tank inner shell is discharged into the space. Therefore, fuel can be maintained at a suitable temperature.

In this manner, fuel can be maintained at a suitable temperature for both heat outside the fuel tank body and a rise in temperature in the fuel tank body. As a result, generation of fuel vapor gas can be inhibited.

In the aforementioned aspect of the present invention, flow means which causes gas to flow into the space may be provided. In this construction, the flow means causes gas to flow into the space, whereby it becomes possible to cool the interior of the fuel tank inner shell. Thus, the raised temperature of fuel in the fuel tank inner shell can be lowered, and generation of vapor can further be inhibited.

In the aforementioned aspect of the present invention, heat radiation means which is provided in the fuel tank inner shell and which radiates heat in the fuel tank inner shell may be provided. In this construction, heat in the fuel tank inner shell can effectively be discharged into the space. Therefore, the raised temperature of fuel in the fuel tank inner shell can be lowered, and generation of vapor can further be inhibited.

In the aforementioned aspect of the present invention, a canister which stores vapor flowing out of the fuel tank inner shell may be provided, and the flow means may be designed to include a first communication member by which the space communicates with the canister.

In general, the higher the temperature of gas flowing into the canister for storing vapor flowing out of the fuel tank inner shell becomes, the easier it becomes for the canister to exert its purge performance. Accordingly, the space communicates with the canister by the first communication member, so that the purge operation is performed with high-temperature gas. As a result, the purge performance is improved. Thereby it becomes possible to store more vapor in the canister.

In the aforementioned aspect of the present invention, the flow means may be designed to include a second communication member by which the canister communicates with the space through an air cleaner.

Accordingly, the space communicates with the canister by the first communication member, and the canister communicates with the space through the air cleaner by the second communication member. As a whole, a purge passage is constructed. This purge passage extends across the air cleaner. Thus, it is possible to cause the gas that has been purified by the air cleaner to flow into the purge passage.

According to a second aspect of the present invention, there is provided a fuel tank system comprising a fuel tank body of a double-layer structure composed of an inner tank shell and an outer tank shell, an intake port formed in the outer tank shell, an intake pipe by which at least one of an air cleaner and a cabin communicates with the intake port, an exhaust port formed in the outer tank shell, and an exhaust pipe by which the exhaust port communicates with an intake system of an engine.

Thus, if the pressure in the intake system of the engine becomes negative with respect to an internal pressure in the inter-tank-shell space between the inner tank shell and the outer tank shell, air in the inter-tank-shell space is sucked out from the exhaust port through the exhaust pipe. As a result, air flows from the intake port into the inter-tank-shell space through the intake pipe which communicates with at least one of the air cleaner and the cabin. Accordingly, it is possible to efficiently cool the fuel tank by supplying the inter-tank-shell space with at least one of air in the air cleaner and air in the cabin. Also, it is possible to prevent foreign matters from entering the engine intake system by supplying at least one of air in the air cleaner and air in the cabin to the intake system of the engine through the inter-tank-shell space.

In the aforementioned aspect of the present invention, the intake pipe may be coupled to an evaporator of an air-conditioner. In this construction, it is possible to more efficiently cool the fuel tank by means of the cooling air that has passed through the evaporator of the air-conditioner.

In the aforementioned aspect of the present invention, intake air control means may be provided. This intake air control means enables air to be sucked through the intake port if the interior of the fuel tank body is higher in temperature than air supplied from the intake pipe. In this construction, only if the interior of the fuel tank body is higher in temperature than the air supplied by the intake pipe, the intake air control means causes intake air to flow from the intake port into the inter-tank-shell space through the intake pipe which communicates with at least one of the air cleaner and the cabin. As a result, it is possible to more efficiently cool the fuel tank.

In the aforementioned aspect of the present invention, the exhaust pipe may be coupled to the canister. In this construction, the purge effect in the canister can be improved by passing the air that has been warmed by the fuel tank through the canister.

In the aforementioned aspect of the present invention, a bypass pipe and exhaust pipe switching means may be provided. The bypass pipe bypasses the canister. The exhaust pipe switching means switches an exhaust path to the bypass pipe in at least one case where purge operation has been stopped and where a temperature of exhaust gas flowing out of the exhaust port is equal to or lower than a predetermined temperature. In this construction, in at least one case where purge operation has been stopped and where a temperature of exhaust gas flowing out of the exhaust port is equal to or lower than a predetermined temperature, the exhaust pipe switching means switches the exhaust path to the bypass pipe. Thereby it becomes possible to cool the fuel tank even if the purge operation has been stopped and to prevent the purge efficiency in the canister from deteriorating due to a fall in exhaust temperature.

In the aforementioned aspect of the present invention, intake pipe switching means may be provided. This intake pipe switching means blows one of air in the air cleaner and air in the cabin that is the lower in temperature to the intake port. Also, the intake pipe may be coupled to both the air cleaner and the cabin. In this construction, it is possible to more efficiently cool the fuel tank by means of one of air in the air cleaner and air in the cabin that is the lower in temperature.

DETAILED DESCRIPTION OF PREFERRED EMBODIMENTS

A fuel tank system in accordance with a first embodiment of the present invention will be described with reference to FIGS. 1 and 2.

Figure 1:
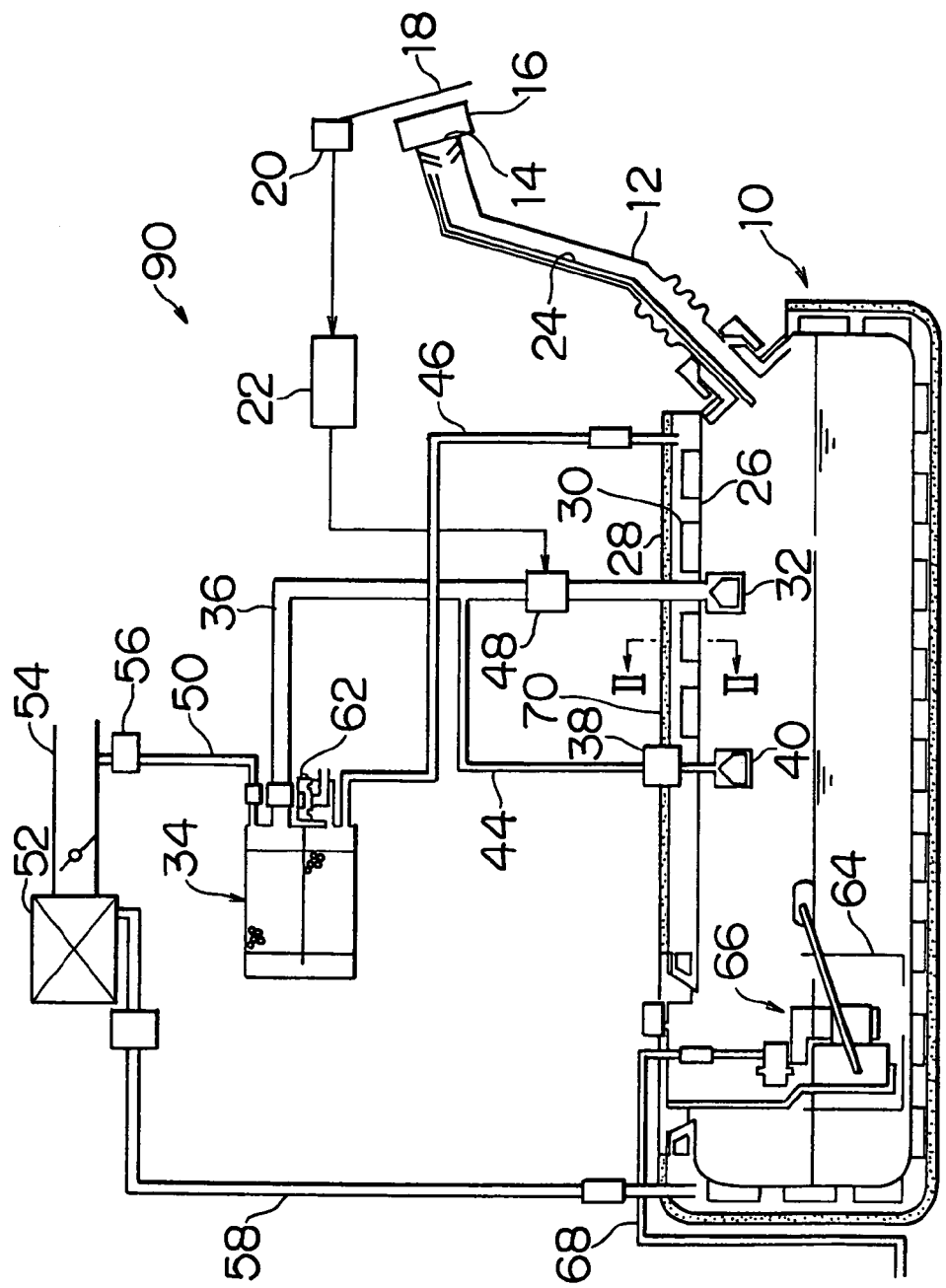
FIG. 1 is a schematic lateral cross-sectional view of a fuel tank system in accordance with a first embodiment of the present invention.

As shown in FIG. 1, in a fuel tank system 90 of this embodiment, one end of an inlet pipe (a fuel filling pipe) 12 penetrates a lateral wall portion of a fuel tank body 10. The end of the inlet pipe 12 is inserted into the fuel tank body 10. The other end of the inlet pipe 12 reaches a feed oil port 14 provided in a vehicular lateral wall portion.

A feed oil cap 16 is mounted to the feed oil port 14. In feeding oil, a feed oil gun (not shown) can be inserted through the feed oil port 14 by opening a fuel lid 18 and removing the feed oil cap 16. In feeding oil, if a fuel level in the inlet pipe 12 rises and a sensor attached to the feed oil gun detects a filled-up state, feed oil operation by the feed oil gun is automatically stopped. The fuel lid 18 is equipped with an open-close detection switch 20 for detecting an open or closed state of the fuel lid 18. The open-close detection switch 20 is connected to a control circuit 22. A vent pipe 24 is disposed in the inlet pipe 12.

Figure 2:
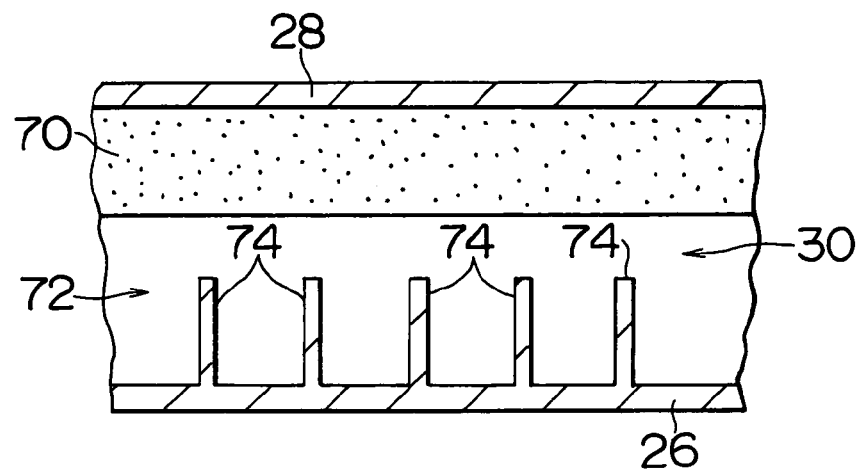
FIG. 2 is an enlarged cross-sectional view of heat radiation means of the fuel tank system in accordance with the first embodiment of the present invention taken along a line II—II shown in FIG. 1.

As is also shown in FIG. 2, the fuel tank body 10 of this embodiment is of a double-layer structure. That is, the fuel tank body 10 has an inner tank shell 26 which accommodates fuel and an outer tank shell 28 which is disposed outside the inner tank shell 26. An inter-tank-shell space 30 is formed between the inner tank shell 26 and the outer tank shell 28 which are adjacent to each other.

In this embodiment, a heat insulation material 70 is disposed on the entire inner surface of the outer tank shell 28. Because of the heat insulation material 70, heat outside the fuel tank body 10 is unlikely to be transmitted to the inter-tank-shell space 30.

As is also apparent from FIG. 1, a heat radiation member 72 is provided at a predetermined position on an outer surface of the inner tank shell 26. As shown in FIG. 2 in detail, the heat radiation member 72 is formed integrally with the inner tank shell 26 and composed of a plurality of heat radiation fins 74 which are erected vertically from the outer surface of the inner tank shell 26 and which are disposed at intervals of a predetermined distance. Because of the heat radiation member 72, heat in the inner tank shell 26 is discharged into the inter-tank-shell space 30.

As shown in FIG. 1, a known float valve 32 for detecting a filled-up state and preventing roll over is disposed in an upper wall portion of the inner tank shell 26 of the fuel tank body 10. A feed-oil vapor line 36 leading to a canister 34 is connected to the float valve 32. The inter-tank-shell space 30 communicates with the canister 34 through a purge line 46. The canister 34 is purged by air in the inter-tank-shell space 30.

An electromagnetic valve is disposed in an intermediate portion of the feed-oil vapor line 36. The electromagnetic valve 48 is connected to the control circuit 22 and opened when oil is fed, that is, when the open-close detection switch 20 detects an open state of the fuel lid 18.

The canister 34 communicates with a surge tank 54 through a purge line 50. The surge tank 54 communicates with an air cleaner 52. A D-VSV (a vacuum switching valve) 56 is disposed in an intermediate portion of the purge line 50. This makes it possible to draw air in the inter-tank-shell space 30 into the canister 34, for example, by utilizing a negative pressure generated by opening or closing a throttle valve. A breather valve 62 is disposed in the canister 34.

On the other hand, the air cleaner 52 communicates with the inter-tank-shell space 30 through an intake pipe 58. If the pressure in the inter-tank-shell space 30 becomes negative, the air that has been purified by the air cleaner 52 flows into the inter-tank-shell space 30 through the intake pipe 58. The purge line 46, the purge line 50 and the intake pipe 58 constitute a purge passage of the present invention. This purge passage extends across the canister 34 and the air cleaner 52.

A cut-off valve 40 is disposed in the upper wall portion of the inner tank shell 26 of the fuel tank body 10. The cut-off valve 40 communicates with a feed-oil vapor line 36 through a line 44 wherein a pressure control valve 38 is provided. Thus, the cut-off valve 40 communicates with the canister 34 through the line 40 and the feed-oil vapor line 36.

Furthermore, a subtank 64 is disposed in the inner tank shell 26. A pump unit 66 is disposed in the subtank 64. A fuel feed pipe 68 is coupled to the pump unit 66.

Next, operation of this embodiment will be described.

The fuel tank body 10 of this embodiment is of a double-layer structure. That is, the fuel tank body 10 is composed of the inner tank shell 26 and the outer tank shell 28. Besides, the heat insulation material 70 is provided on the outer tank shell 28. Thus, even if the temperature outside the fuel tank body 10 rises, the heat that has entered the fuel tank body 10 from outside is insulated by the heat insulation material 70. That is, fuel in the fuel tank body 10 is prevented from rising in temperature due to the heat from outside (a rise in temperature). This inhibits generation of vapor.

In general, heat is generated in the fuel tank body 10, for example, through operation of the pump unit 66 and the like, so that the temperature of fuel tends to rise. Further, in many cases, so-called return fuel is higher in temperature than fuel in the fuel tank body 10. Therefore, inflow of this return fuel also tends to raise a temperature of fuel in the fuel tank body 10. However, in any case, the heat of fuel in the fuel tank body 10 is discharged into the inter-tank-shell space 30. Thus, the heat of fuel in the fuel tank body 10 is prevented from rising in temperature, and generation of vapor is inhibited. In particular, the heat radiation member 72 is provided in the inner tank shell 26 constituting the fuel tank body 10 of this embodiment, and the heat of fuel in the fuel tank body 10 is efficiently discharged into the inter-tank-shell space 30. Thus, fuel in the fuel tank body 10 is more effectively prevented from rising in temperature, and generation of vapor is inhibited.

Besides, in the fuel tank body 10 of this embodiment, air in the inter-tank-shell space 30 is drawn into the canister 34 by utilizing a negative pressure generated through the opening or closing of the throttle valve or the like. If the pressure in the inter-tank-shell space 30 thereby becomes negative, the air that has been purified by the air cleaner 52 flows into the inter-tank-shell space 30 through the intake pipe 58. The air that has been purified by the air cleaner 52 is lower in temperature than air in the inter-tank-shell space 30 (approximately equal to an outside air temperature). Thus, inflow of this low-temperature air into the inter-tank-shell space 30 makes it possible to more efficiently discharge heat of fuel in the fuel tank body 10 into the inter-tank-shell space 30, prevent the temperature of fuel in the fuel tank body 10 from rising, and reduce a generation amount of vapor.

Further, in the fuel tank system 90 of this embodiment, the air that has risen in temperature in the inter-tank-shell space 30 is drawn into the canister 34 through the purge line 46. Therefore, purging operation is performed with warmer air and hence more effectively. Thereby it becomes possible to store more vapor in the canister 34.

Besides, since the heat radiation member 72 (heat radiation means) is integrated with the inner tank shell 26, the number of parts does not increase in comparison with the case where heat radiation means is provided separately.

Further, in the fuel tank body 10 of this embodiment, the inter-tank-shell space 30 between the inner tank shell 26 and the outer tank shell 28 makes it difficult to transmit noise in the inner tank shell 26. In fuel tanks of the related art, a partition (separator) may be provided in the fuel tank to restrict flow of fuel, or a sound insulating material may be provided to prevent flow noise of fuel from being transmitted to the outside of the fuel tank body. This embodiment makes it possible to dispense with or simplify such a partition or such a sound insulating material.

Figure 3:
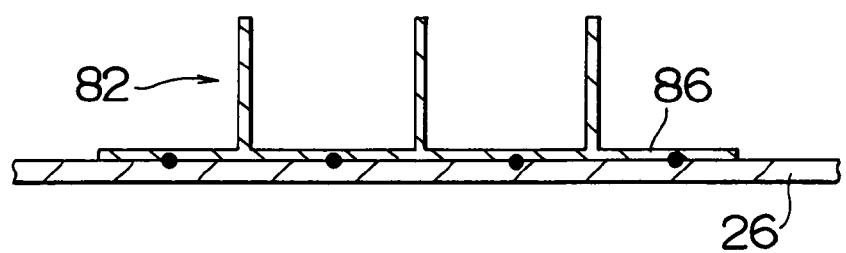
FIG. 3 is an enlarged cross-sectional view of heat radiation means of a fuel tank system in accordance with a second embodiment of the present invention.
Figure 4:
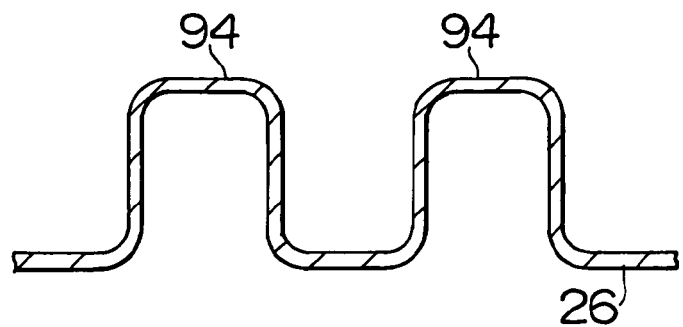
FIG. 4 is an enlarged cross-sectional view of heat radiation means of a fuel tank system in accordance with a third embodiment of the present invention.

FIGS. 3 and 4 show heat radiation means in accordance with second and third embodiments of the present invention respectively. The second and third embodiments are different from the first embodiment only in the structure of the heat radiation means and identical to the first embodiment as to the overall structure of the fuel tank system. Thus, the following description will be limited to the heat radiation means. In other words, the description of other components will be omitted.

In the second embodiment shown in FIG. 3, a heat radiation member 82 formed separately from the inner tank shell 26 is mounted to the outer surface of the inner tank shell 26. The heat radiation member 82 is composed of a stationary plate 86 fixed to the inner tank shell 26 and heat radiation fins 84 erected from the stationary plate 86.

The stationary plate 86 is welded at a predetermined portion and fixed to the inner tank shell 26, whereby the heat radiation member 82 is mounted to the inner tank shell 26.

Thus, also in the second embodiment, as in the first embodiment, heat of fuel in the fuel tank body 10 is discharged into the inter-tank-shell space 30 through the heat radiation member 82. Thus, fuel in the fuel tank body 10 is prevented from rising in temperature, and generation of vapor is inhibited.

As long as the heat radiation member 82 can be mounted to the inner tank shell 26, means other than the aforementioned welding can also be employed. For example, the heat radiation member 82 may be mounted to the inner tank shell 26 by calking. Further, the inner tank shell 26 may be made from a resin, and the heat radiation member 82 may be made from a metal. In this case, the heat radiation member 82 may be mounted to the inner tank shell 26 by insert molding.

In the third embodiment shown in FIG. 4, the periphery of the inner tank shell 26 is generally undulate, so that a plurality of beads 94 are provided in the inner tank shell 26. In this manner, an enlarged surface area of the inner tank shell 26 constitutes heat radiation means.

Also in the third embodiment, as in the first and second embodiments, heat of fuel in the fuel tank body 10 is discharged into the inter-tank-shell space 30 through the beads 94. Thus, fuel in the fuel tank body 10 is prevented from rising in temperature, and generation of vapor is inhibited. Besides, as in the first embodiment, since heat radiation means (the beads 94) is integrated with the inner tank shell 26, the number of parts does not increase in comparison with the case where heat radiation means is provided separately.

In this manner, any of the aforementioned embodiments makes it possible to reduce a generation amount of vapor not only by preventing a rise in temperature resulting from the heat that has entered the fuel tank body 10 from outside but also by preventing a rise in temperature resulting from inner heat.

The aforementioned description handles an example of the construction wherein the air that has been purified by the air cleaner 52 flows into the inter-tank-shell space 30 through the intake pipe 58. However, the construction for causing air to flow into the inter-tank-shell space 30 is not always limited thereto. For example, it is also possible to employ a construction wherein one end of the intake pipe 58 (an end which is out of communication with the inter-tank-shell 30) is opened towards the outside so that outside air is fed into the inter-tank-shell space 30 without using the air cleaner 52. It is preferable to provide the air cleaner 52 as in the aforementioned embodiments. This is because the air that has been purified by the air cleaner 52 can be fed to the purge passage (the purge line 46, the purge line 50 and the intake pipe 58) and the inter-tank-shell space 30.

A specific construction of heat radiation means is not limited to the aforementioned construction. For example, the number, size, positions and the like of the heat radiation fins 74, 84 and the beads 94 are determined in consideration of an amount of heat discharged into the inter-tank-shell space 30, the structure of the fuel tank body 10 and the like.

Further, the inner tank shell 26 and the outer tank shell 28 are not specifically limited in material or thickness either. That is, in consideration of ease of molding and resistance to fuel and pressure, the inner tank shell 26 and the outer tank shell 28 are molded in a required and sufficient thickness and made from a preferable material selected, for example, from metals, resins and the like. Especially in view of resistance to fuel, it is preferable to make the inner tank shell 26 from a metal material. However, in a construction wherein the heat radiation means is molded integrally with the inner tank shell 26 as in the first embodiment, the inner tank shell 26 may be made from a resin to facilitate a molding process. On the other hand, in a construction wherein the inner tank shell 26 is separated from the heat radiation member 82 as in the second embodiment, the two components can be made from different materials. For example, the inner tank shell 26 and the heat radiation member 82 may be made from a metal and a resin respectively. In the case where the beads 94 are formed as in the third embodiment, if the inner tank shell 26 is made from a metal, the beads 94 can be formed easily, for example, by press forming or the like.

By the same token, the material, position and the like of the heat insulation material are determined in consideration of a predicted outside temperature, the structure of the fuel tank body and the like. For example, the heat insulation material 70 may be provided outside the outer tank shell 28. Further, in order to insulate heat from entering the fuel tank body 10 from outside, it is preferable that the heat insulation material 70 be provided on the entire surface of the outer tank shell 28. As an example of the heat insulation material 70, a generally known resin is used. The heat insulation material 70 may be formed from a porous material (a foamed resin, a sponge material and the like). The structure for mounting the heat insulation material 70 to the outer tank shell 28 is not specifically limited. For example, the heat insulation material 70 may be mounted to the outer tank shell 28 by means of adhesion or welding, or other well-known mounting techniques. Alternatively, the heat insulation material may elastically be deformed and pressed into the outer tank shell 28 so that the heat insulation material 70 is press-fitted to the inner surface of the outer tank shell 28 by an elastic counterforce.

The aforementioned description handles an example of a double-layer tank structure wherein a single outer tank shell 28 is provided outside the inner tank shell 26. However, it is also possible to employ a structure having more than two layers (a multi-layer tank shell structure) by providing a plurality of outer tank shells 28. In this case, the effect of the present invention can sufficiently be achieved if at least one inter-tank-shell space 30 is constructed between the inner tank shell 26 and the outer tank shell 28 that is disposed outwardly thereof. Still, inter-tank-shell spaces 30 may be constructed among a plurality of outer tank shells 28.

The effect of the present invention can be achieved as long as the heat insulation material 70 is provided on at least one of a plurality of outer tank shells 28. However, heat insulation effect can further be enhanced by providing the heat insulation material 70 on two or more of the outer tank shells 28.

Next, a fuel tank system in accordance with a fourth embodiment of the present invention will be described with reference to FIGS. 5 and 6.

In this embodiment, components identical to those of the first embodiment will be denoted by the same reference numerals and the description thereof will be omitted.

Figure 5:
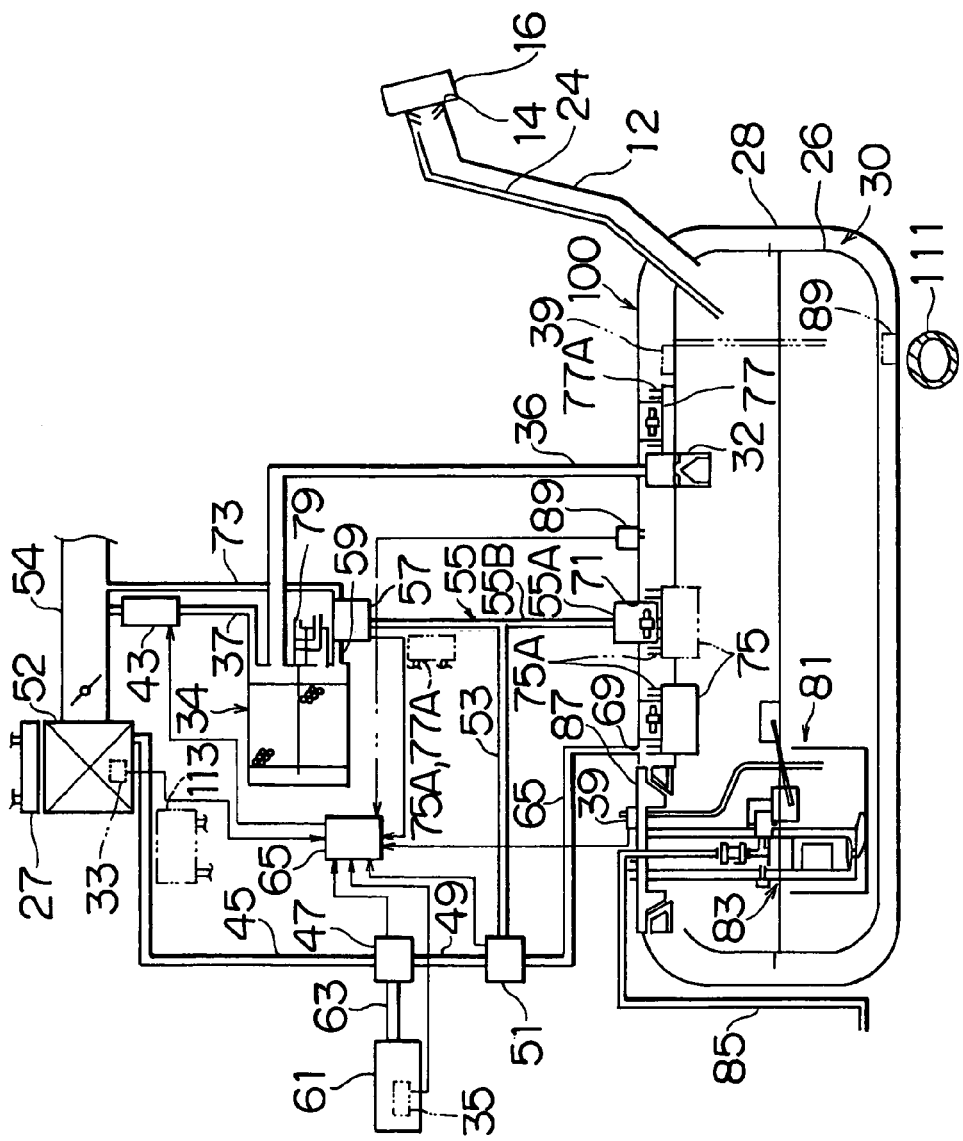
FIG. 5 is a schematic lateral cross-sectional view of a fuel tank in accordance with a fourth embodiment of the present invention.

As shown in FIG. 5, a fuel tank body 100 of this embodiment has a double-layer structure composed of an inner tank shell 26 and an outer tank shell 28. An inter-tank-shell space 30 is formed between the inner tank shell 26 and the outer tank shell 28 which are adjacent to each other. A known float valve 32 for detecting a filled-up state and preventing roll over is disposed in an upper wall portion of the inner tank shell 26 of the fuel tank body 100. A feed-oil vapor line 36 leading to a canister 34 is connected to the float valve 32.

Further, the canister 34 communicates with a surge tank 54 through a purge line 37. The surge tank 54 is designed as an intake system of an engine leading to an air cleaner 52. The purge line 37 constitutes part of an exhaust pipe. A purge control valve 43 is disposed in an intermediate portion of the purge line 37. On the other hand, the air cleaner 52 communicates with the canister 34 through an intake pipe 45, a first switching valve 47 designed as intake pipe switching means, an intake pipe 49, a second switching valve 51 designed as intake control means, a connecting pipe 53, an exhaust pipe 55, a third switching valve 57 designed as exhaust pipe switching means, and an exhaust pipe 59.

A temperature sensor 33 for detecting a temperature in the air cleaner 52 is disposed therein. For example, the temperature sensor 33 is connected to a control circuit 65 which is provided with an engine control circuit and the like. Thus, the temperature sensor 33 detects a temperature T1 in the air cleaner 52 and outputs it to the control circuit 65. Further, a cooling device 27 for cooling the interior of the air cleaner by means of air-conditioning coolant is also disposed in the air cleaner 52. An intake pipe 63, which communicates with the interior of a cabin 61, is connected to the first switching valve 47. A temperature sensor 35 for detecting a temperature T2 of the interior of the cabin 61 is disposed therein. The temperature sensor 35 is connected to the control circuit 65. Thus, the temperature sensor 35 detects a temperature T2 of the interior of the cabin 61 and outputs it to the control circuit 65.

Further, the first switching valve 47 is connected to the control circuit 65. Based on an output signal from the control circuit 65, the first switching valve 47 couples one of the intake pipe 45 and the intake pipe 63 to the intake pipe 49.

The second switching valve 51 is coupled to an intake port 69 formed in the outer tank shell 28 through an intake pipe 67. Further, the second switching valve 51 is connected to the control circuit 65. Based on an output signal from the control circuit 65, the second switching valve 51 couples the intake pipe 49 to one of the connecting pipe 53 and the intake pipe 67.

One end 55A of the exhaust pipe 55 is coupled to an exhaust port 71 formed in the outer tank shell 28. The connecting pipe 53 is coupled to an intermediate portion 55B of the exhaust pipe 55.

The third switching valve 57 communicates with the surge tank 54 through a bypass pipe 73. Further, the third switching valve 57 is connected to the control circuit 65. Based on an output signal from the control circuit 65, the third switching valve 57 couples the exhaust pipe 55 to one of the exhaust pipe 59 and the bypass pipe 73. To be more specific, in at least one of the cases where the purge operation has been stopped and where the temperature of exhaust gas flowing out of the exhaust port 71 is equal to or lower than a predetermined temperature, the third switching valve 57 couples the exhaust pipe 55 to the bypass pipe 73 based on an output signal from the control circuit 65.

A Peltier unit 75, which cools the interior of the inner tank shell 26, is disposed in the vicinity of the intake port 69 formed in the outer tank shell 28. Further, a Peltier unit 77, which cools vapor passing through the feed oil vapor line 36, is disposed in the inner tank shell 26 at a position where the float valve 32 is disposed. These Peltier units 75, 77 have heat radiation portions 75A, 77A respectively. The heat radiation portions 75A, 77A are disposed in the inter-tank-shell space 30 and cooled by air therein. A breather valve 79 is disposed in the canister 34.

A subtank 81 is disposed in the fuel tank body 10. A pump unit 83 is disposed in the subtank 81. A fuel feed pipe 85 leading to the engine is coupled to the pump unit 83. Further, a temperature sensor 89 is disposed in an upper wall portion of the outer tank shell 28. The temperature sensor 89 detects a temperature T3 in the inter-tank-shell space 30. A temperature sensor 39 is disposed on a plate 87 supporting the pump unit 83. The temperature sensor 39 detects a temperature T4 in the subtank 81.

Figure 6:
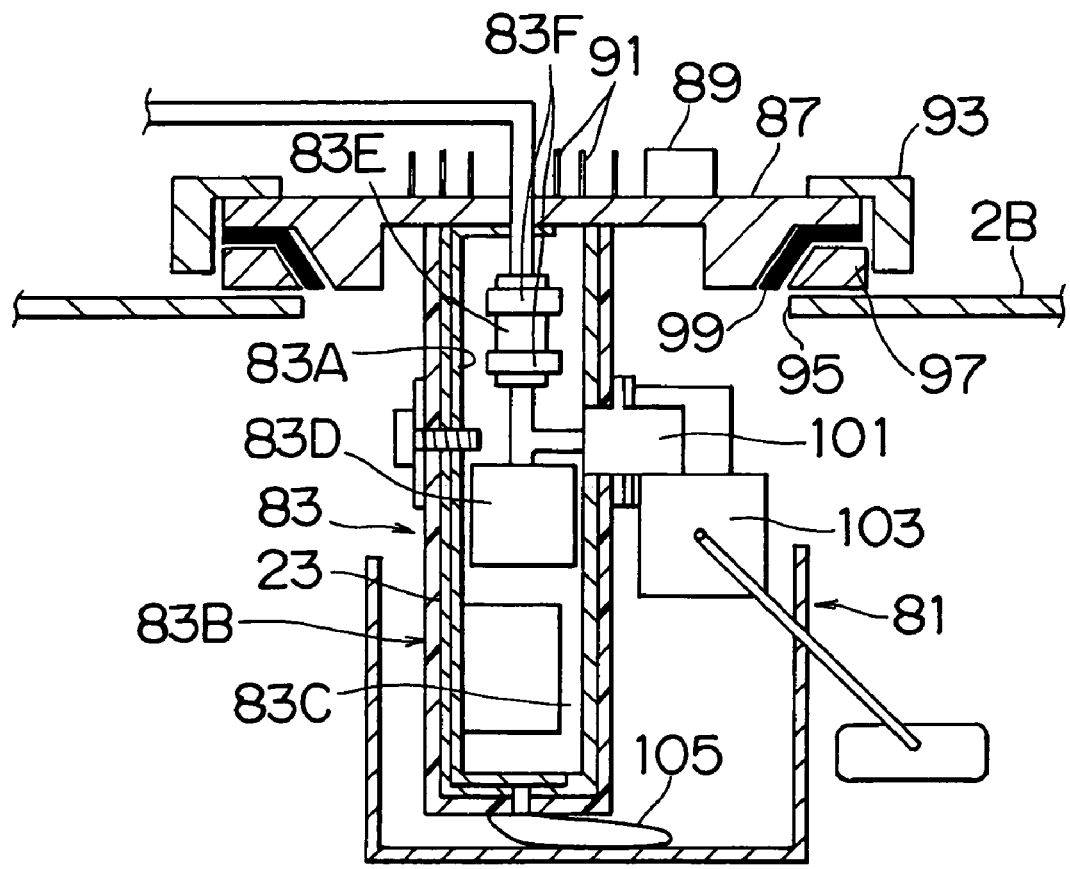
FIG. 6 is a schematic lateral cross-sectional view of a subtank of the fuel tank in accordance with the fourth embodiment of the present invention.
Figure 7:
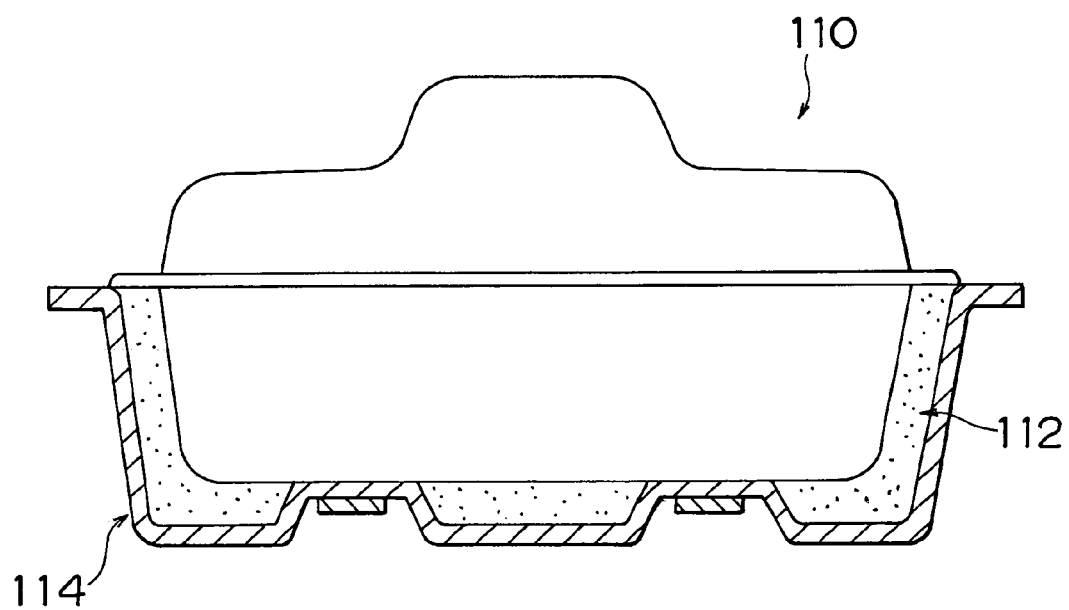
FIG. 7 is a schematic lateral cross-sectional view of a fuel tank system.
Figure 8A:
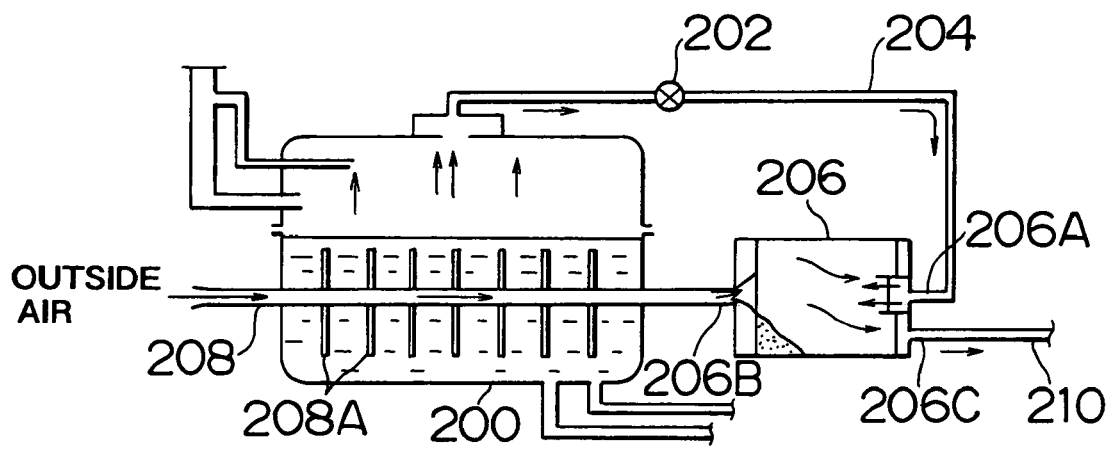
FIG. 8A is a schematic lateral cross-sectional view of a fuel tank.
Figure 8B:
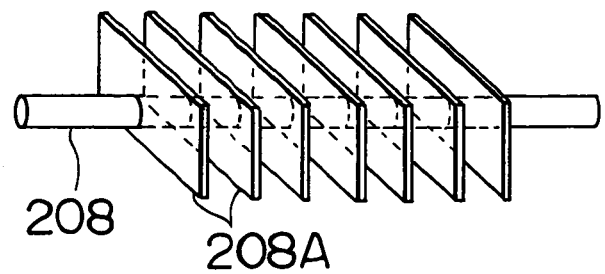
FIG. 8B is a perspective view of a purge air admission pipe of the fuel tank.

As shown in FIG. 6, the pump unit 83 is fixed to a lower surface of the plate 87 by a bracket 83A. An outer peripheral portion and a lower surface of the pump unit 83 are covered with a heat insulation material 83B. A heat conduction layer 23 made from a material of good heat conductivity is disposed on an inner peripheral portion of the heat insulation material 83B. The heat insulation layer 23 transmits heat generated in the pump unit 83 to the plate 87. Further, heat radiation fins 91 for cooling the plate 87 are erected from an upper surface of the plate 87. The plate 87 is mounted to a retainer 97 by a support 93 through a gasket 99. The retainer 97 is disposed along an outer periphery of an opening portion 95 of the outer tank shell 28.

Referring to FIG. 6, reference numerals 83C, 83D, 83E, 83F, 101, 103 and 105 denote a pump body, a filter, a hose, a clip, a pressure regulator, a gauge and a filter respectively.

Next, operation of this embodiment will be described.

In this embodiment, air in the inter-tank-shell space 30 is caused to circulate to cool the fuel tank body 100 by utilizing a negative pressure in the intake system of the engine, more specifically, a negative pressure in the surge tank 54 leading to the air cleaner 52.

That is, the canister 34 communicates with the surge tank 54 through the purge line 37. The surge tank 54 communicates with the air cleaner 52. The pressure in the canister 34 becomes negative due to a negative pressure in the surge tank 54. At this moment, if the purge operation has not been stopped and if the temperature in the inter-tank-shell space 30 (the temperature of exhaust gas flowing out of the exhaust port 71) is higher than a predetermined temperature, the third switching valve 57 couples the exhaust pipe 59 to the exhaust pipe 55. As a result, air in the inter-tank-shell space 30 flows into the canister 34 through the exhaust pipe 55, the third switching valve 57 and the exhaust pipe 59 from the exhaust port 71 formed in the outer tank shell 28.

On the other hand, the control circuit 65 compares a temperature T1 in the air cleaner 52, a temperature T2 in the cabin 61 and a temperature T3 in the inter-tank-shell space 30 (although a high temperature T4 in the subtank 80 may be used instead of the temperature T3 to make it easy to judge differences in temperature during control, operation of this embodiment will be described as to the case where the temperature T3 in the inter-tank-shell space 30 is used). If the temperature T1 in the air cleaner 52 and the temperature T2 in the cabin 61 are lower than the temperature T3 in the inter-tank-shell space 30, and if the temperature T1 in the air cleaner 52 is lower than the temperature T2 in the cabin 61, the first switching valve 47 couples the intake pipe 45 to the intake pipe 49, and the second switching valve 51 couples the intake pipe 49 to the intake pipe 67. Thus, air in the air cleaner 52 that has been cooled by the cooling device 27 flows into the inter-tank-shell space 30 from the intake port 69 formed in the outer tank shell 28, thereby cooling the fuel tank body 100.

The control circuit 65 compares a temperature T1 in the air cleaner 52, a temperature T2 in the cabin 61 and a temperature T3 in the inter-tank-shell space 30. If the temperature T1 in the air cleaner 52 and the temperature T2 in the cabin 61 are lower than the temperature T3 in the inter-tank-shell space 30, and if the temperature T2 in the cabin 61 is lower than the temperature T1 in the air cleaner 52, the first switching valve 47 couples the intake pipe 63 to the intake pipe 49, and the second switching valve 51 couples the intake pipe 49 to the intake pipe 67. Thus, air in the cabin 61 flows into the inter-tank-shell space 30 from the intake port 69 formed in the outer tank shell 28, thereby cooling the fuel tank body 100.

The control circuit compares a temperature T1 in the air cleaner 52, a temperature T2 in the cabin 61 and a temperature T3 in the inter-tank-shell space 30. If the temperature T1 in the air cleaner 52 and the temperature T2 in the cabin 61 are equal to or higher than the temperature T3 in the inter-tank-shell space 30, the second switching valve 51 couples the intake pipe 49 to the connecting pipe 53. Thus, air in the air cleaner 52 or air in the cabin 61 flows into the exhaust pipe 55 without flowing into the inter-tank-shell space 30.

Thus, in this embodiment, the fuel tank body 100 can be cooled efficiently. Further, since air in the air cleaner 52 or air in the cabin 61 is returned to the surge tank 54 through the inter-tank-shell space 30, it is possible to prevent foreign matters from entering the intake system of the engine.

Further, in this embodiment, if the purge operation has been stopped, the control circuit 65 closes the purge control valve 43 and couples the exhaust pipe 55 to the bypass pipe 73 by means of the third switching valve 57. Thus, even if the purge operation has been stopped, it is possible to ensure a certain amount of air flowing in the inter-tank-shell space 30 by utilizing a negative pressure in the intake system of the engine. Therefore, the fuel tank body 100 can be cooled even if the purge operation has been stopped.

Further, in this embodiment, the heat radiation portions 75A, 77A of the Peltier units 75, 77 are disposed in the inter-tank-shell space 30. Therefore, the heat radiation portions 75A, 77A can effectively be cooled by air flowing in the inter-tank-shell space 30.

Further, in this embodiment, if the temperature T3 in the inter-tank-shell space 30 is equal to or lower than a predetermined temperature, the control circuit 65 couples the exhaust pipe 55 to the bypass pipe 71 by means of the third switching valve 57. Therefore, it is possible to prevent the purge efficiency in the canister 34 from deteriorating due to a fall in temperature of the exhaust gas flowing out of the inter-tank-shell space 30.

Further, in this embodiment, as shown in FIG. 2, the outer peripheral portion and the lower surface of the pump unit 83 are covered with the heat insulation material 83B. Thus, heat generated from the pump unit 83 is not entirely transmitted to the interior of the inner tank shell 26. As a result, it is possible to inhibit a rise in temperature in the inner tank shell 26. This makes it possible to reduce a generation amount of vapor in the inner tank shell 26.

Further, in this embodiment, the heat conduction layer 83 disposed on the inner peripheral portion of the heat insulation material 83B transmits heat generated in the pump unit 83 to the plate 87. Also, the heat radiation fins 91 formed on the upper surface of the plate 87 effectively radiate heat generated from the pump unit 83 to the outside of the fuel tank 100. Thus, it is possible to effectively prevent a rise in temperature of the pump unit 83.

Although some specific embodiments of the present invention have been described hitherto in detail, it is obvious to those skilled in the art that the present invention is not limited to those embodiments and that a variety of other embodiments are possible within the scope of the present invention. For example, the aforementioned embodiments have a construction wherein the temperature sensor 89 is disposed in the upper wall portion of the outer tank shell 28 to detect a temperature T3 in the inter-tank-shell space 30 and wherein the temperature sensor 39 is disposed on the plate 87 supporting the pump unit 83 to detect a temperature T4 in the subtank 81. Positions where the temperature sensors 89, 39 are disposed are not limited to those of the aforementioned embodiments. In order to make it easy to judge differences in temperature during control, the temperatures T3, T4 are preferably measured in portions of higher temperatures. For example, as indicated by an alternate long and two short dashes line in FIG. 5, it is also possible to employ a construction wherein the temperature sensors 89, 39 for detecting temperatures are disposed in portions which are in the vicinity of an exhaust pipe 111 of the engine and which are thus affected by heat therefrom.

Further, in this embodiment, the Peltier unit 75 for cooling the interior of the inner tank shell 26 is disposed in the vicinity of the intake port 69 formed in the outer tank shell 28. The position of the Peltier unit 75 is not limited thereto. For example, as indicated by an alternate long and two short dashes line in FIG. 5, it is also possible to employ a construction wherein the Peltier unit 75 is disposed at a position opposed to the exhaust port 71 formed in the outer tank shell 28 and wherein air in the inter-tank-shell space 30 is discharged to the exhaust port 71 not only by a negative pressure in the intake system of the engine but also by a fan of the heat radiation portion 75A.

Further, in this embodiment, the cooling device 27 for cooling the interior of the air cleaner 52 by means of air-conditioning coolant is disposed. However, the construction for cooling air from the air cleaner 52 is not limited thereto. For example, as indicated by an alternate long and two short dashes line in FIG. 5, it is also possible to employ a construction wherein a cooling device 113 for cooling the intake pipe 45 by means of air-conditioning coolant is disposed.

Further, according to the construction of this embodiment, if the temperature T1 in the air cleaner 52 and the temperature T2 in the cabin 61 are lower than the temperature T3 in the inter-tank-shell space 30, and if the temperature T2 in the cabin 61 is lower than the temperature T1 in the air cleaner 52, air in the cabin 61 is caused to flow into the inter-tank-shell space 30. However, instead of this construction, it is also possible to employ a construction wherein the first switching valve 47 and the second switching valve 51 cause air in the cabin 61 into the inter-tank-shell space 30 only when the interior of the cabin is cooled by an air-conditioner.

Further, in this embodiment, the heat radiation portions 75A, 77A of the Peltier units 75, 77 are disposed in the inter-tank-shell space 30. However, it is also possible to employ a construction wherein only the heat radiation portions 75A, 77A of the Peltier units 75, 77 are disposed in the vicinity of the exhaust pipe 55 and wherein air flowing in the exhaust pipe 55 is heated by heat radiated from the heat radiation portions 75A, 77A to thereby improve adsorption performance of activated carbon in the canister 34 and enhance the purge efficiency.

What is claimed is:

1. A fuel tank system for a vehicle comprising:
   a fuel tank inner shell which accommodates fuel;
   a fuel tank outer shell disposed outside the inner shell, defining a space between the fuel tank outer shell and the fuel tank inner shell;
   a heat insulation material provided on the fuel tank outer shell;
   flow means for causing a coolant to flow through the space to reduce a temperature of the fuel in the fuel tank inner shell, said flow means comprising a coolant inlet and a coolant outlet;
   a fuel passage with an end provided in the fuel tank inner shell;
   a canister storing vapor flowing out of the fuel tank inner shell;
   a fuel filling pipe connected with the fuel tank inner shell for supplying fuel to the fuel tank inner shell from a source that is provided outside the vehicle; and a pump associated with the fuel passage for delivering the fuel from the inner shell to the vehicle engine;

wherein the flow means includes a first communication member by which the space communicates with the canister, said first communication member being connected to said coolant outlet;

and wherein the flow means includes a second communication member by which the canister communicates with the space through an air cleaner.

2. The fuel tank system according to claim 1, further comprising:

heat radiation means provided in the fuel tank inner shell for radiating heat from the fuel tank inner shell.

3. The fuel tank system of claim 1, wherein said coolant is air.

4. A vehicle fuel tank system for a vehicle comprising:
a fuel tank inner shell which accommodates fuel;
a fuel tank outer shell disposed outside the inner shell, defining a space between the fuel tank outer shell and the fuel tank inner shell;
flow means for causing coolant to flow through said space, said flow means comprising switching means for switching between one of a first coolant source, a second coolant source, a coolant inlet, and a coolant outlet;
a fuel passage with an end provided in the fuel tank inner shell;
a canister storing vapor flowing out of the fuel tank inner shell;
a fuel filling pipe connected with the fuel tank inner shell for supplying fuel to the fuel tank inner shell from a source that is provided outside the vehicle; and
a pump associated with the fuel passage for delivering the fuel from the inner shell to the vehicle engine;
wherein the flow means includes a first communication member by which the space communicates with the canister, said first communication member being connected to said coolant outlet.

5. The vehicle fuel tank system of claim 4, wherein said coolant is air.

6. The vehicle fuel tank system of claim 4, wherein said first coolant source is an air cleaner of the vehicle.

7. The vehicle fuel tank system of claim 4, wherein said second coolant source is a cabin of the vehicle.

8. The vehicle fuel tank system of claim 4, wherein said flow means further comprises temperature sensing means for sensing a temperature of the first coolant source and a temperature of said second coolant source and for sending a signal to said switching means.

9. The vehicle fuel tank system of claim 4, wherein said switching means comprises a valve.

10. The fuel tank system of claim 1, further comprising a first Peltier unit provided between the inner and outer fuel tank shells.

11. The fuel tank system of claim 10, further comprising a second Peltier unit provided in the inner fuel tank shell.

12. A fuel tank system for a vehicle comprising:
a fuel tank inner shell which accommodates fuel;
a fuel tank outer shell disposed outside the inner shell, defining a space between the fuel tank outer shell and the fuel tank inner shell;
a heat insulation material provided on the fuel tank outer shell;
flow means for causing a coolant to flow through the space to reduce a temperature of the fuel in the fuel tank inner shell, said flow means comprising a coolant inlet and a coolant outlet;
a fuel passage with an end provided in the fuel tank inner shell;
a canister storing vapor flowing out of the fuel tank inner shell;
a fuel filling pipe connected with the fuel tank inner shell for supplying fuel to the fuel tank inner shell from a source that is provided outside the vehicle;
a pump associated with the fuel passage for delivering the fuel from the inner shell to the vehicle engine; and
a purge means for providing a purge flow of coolant through the space between the inner and outer fuel tank shells, and a bypass pipe and switching valve for providing a backup flow of coolant when the purge flow is stopped;
wherein the flow means includes a first communication member by which the space communicates with the canister, said first communication member being connected to said coolant outlet.

13. The fuel tank system of claim 12, wherein said bypass pipe and switching valve communicate with an engine intake, and the backup flow through the bypass pipe and switching valve is created by a low pressure in the engine intake.

14. The fuel tank system of claim 1, wherein said second communication member is connected to said coolant inlet.

15. A fuel tank system for a vehicle comprising:
a fuel tank inner shell which accommodates fuel;
a fuel tank outer shell disposed outside the inner shell, defining a space between the fuel tank outer shell and the fuel tank inner shell;
flow means for causing a coolant to flow through the space to reduce a temperature of fuel in the fuel tank inner shell, said flow means comprising a coolant inlet and a coolant outlet;
a fuel passage with an end provided in the fuel tank inner shell;
a canister storing vapor flowing out of the fuel tank inner shell;
a fuel filling pipe connected with the fuel tank inner shell for supplying fuel to the fuel tank inner shell from a source that is provided outside the vehicle; and
a pump associated with the fuel passage for delivering the fuel from the inner shell to the vehicle engine;
wherein the flow means includes a first communication member by which the space communicates with the canister, said first communication member being connected to said coolant outlet, wherein the flow means includes a second communication member by which the canister communicates with the space through an air cleaner, and wherein said second communication member is connected to said coolant inlet.

16. The fuel tank system of claim 1, wherein said second communication member includes a third communication member communicating with the space and a fourth communication member communicating the third communication member with the canister.

17. The fuel tank system of claim 16, wherein the third communication member communicates with an air cleaner, and wherein the fourth communication member communicates with the third communicator through said air cleaner.

18. The A fuel tank system for a vehicle comprising:
a fuel tank inner shell which accommodates fuel;
a fuel tank outer shell disposed outside the inner shell, defining a space between the fuel tank outer shell and the fuel tank inner shell;
a heat insulation material provided on the fuel tank outer shell;

flow means for causing a coolant to flow through the space to reduce a temperature of the fuel in the fuel tank inner shell, said flow means comprising a coolant inlet and a coolant outlet;

a fuel passage with an end provided in the fuel tank inner shell;

a canister storing vapor flowing out of the fuel tank inner shell;

a fuel filling pipe connected with the fuel tank inner shell for supplying fuel to the fuel tank inner shell from a source that is provided outside the vehicle;

a pump associated with the fuel passage for delivering the fuel from the inner shell to the vehicle engine; and a feed-oil vapor line which supplies fuel vapor in the fuel tank inner shell to the canister, and an electromagnetic valve disposed on said feed-oil vapor line, said electromagnetic valve opening when the fuel is supplied to the fuel tank inner shell;

wherein the flow means includes a first communication member by which the space communicates with the canister, said first communication member being connected to said coolant outlet.

* * * * *

UNITED STATES PATENT AND TRADEMARK OFFICE
CERTIFICATE OF CORRECTION

PATENT NO.   : 6,957,542 B1
DATED        : October 25, 2005
INVENTOR(S)  : Katsuyuki Kido et al.

It is certified that error appears in the above-identified patent and that said Letters Patent is hereby corrected as shown below:

Column 14,
Line 61, before "A fuel tank system" delete "The".

Signed and Sealed this

Third Day of January, 2006

JON W. DUDAS
*Director of the United States Patent and Trademark Office*